United States Patent [19]

Kurata

[11] Patent Number: 4,536,802
[45] Date of Patent: Aug. 20, 1985

[54] FACSIMILE APPARATUS

[75] Inventor: Masami Kurata, Kanagawa, Japan

[73] Assignee: Fuji Xerox Co., Ltd., Tokyo, Japan

[21] Appl. No.: 455,459

[22] Filed: Jan. 4, 1983

[30] Foreign Application Priority Data

Jan. 8, 1982 [JP] Japan .................................. 57-920

[51] Int. Cl.³ .............................................. H04N 1/04
[52] U.S. Cl. .................................................... 358/287
[58] Field of Search ...................... 358/287, 257; 382/9

[56] References Cited

U.S. PATENT DOCUMENTS

| | | | |
|---|---|---|---|
| 3,272,918 | 9/1966 | Koll et al. | 358/287 |
| 3,541,245 | 11/1970 | Wilby | 358/287 |
| 4,124,871 | 11/1978 | Morrin, II | 358/287 |
| 4,163,605 | 8/1979 | Yamada | 358/287 |
| 4,275,450 | 6/1981 | Potter | 358/287 |
| 4,346,410 | 8/1982 | Maeno | 358/257 |
| 4,365,276 | 12/1982 | Kokaji et al. | 358/287 |
| 4,366,508 | 12/1982 | Crean et al. | 358/287 |
| 4,417,805 | 11/1983 | Kishi | 358/287 |
| 4,449,152 | 5/1984 | Kurata et al. | 358/287 |

FOREIGN PATENT DOCUMENTS 0038757  3/1980  Japan .................................. 358/287

Primary Examiner—Howard W. Britton
Assistant Examiner—Victor R. Kostak
Attorney, Agent, or Firm—Sughrue, Mion, Zinn, Macpeak & Seas

[57] ABSTRACT

A facsimile apparatus in which the transmitted picture image is partially or totally enlarged at the receiving unit thereof. If the recorded image is to be smaller than the original image, a first switch is closed at the transmitter unit and information bits are periodically removed from both the main scanning and subscanning portions of the transmitted picture signal. If the recorded image is to be larger than the original image, a second switch is closed at the transmitter unit and expansion bits are periodically inserted in the subscanning portion of the transmitted picture signal. In the latter case, a third switch is closed in the receiver unit and expansion bits are inserted into the main scanning portion of the signal. Alternatively, the transmitter can send an instruction signal, in which case the receiver inserts expansion bits in both the main and subscanning directions.

13 Claims, 5 Drawing Figures

MAIN SCANNING DIRECTION
SUBSCANNING DIRECTION

MAIN SCANNING DIRECTION
SUBSCANNING DIRECTION

FACSIMILE APPARATUS

BACKGROUND OF THE INVENTION

This invention relates to a facsimile apparatus which is capable of efficiently transferring an enlarged or reduced picture image.

In facsimile operations, a situation occasionally arises in which the picture image to be transmitted is either larger or smaller than the paper upon which it is to be recorded. Ordinarily, this problem is overcome by enlarging or reducing the picture image at the transmission facsimile unit.

FIGS. 1A and 1B illustrate a process for enlarging a picture image to 125% of its original size. The facsimile unit at the transmitting side enlarges the original picture information bits 1 (represented by the mark O) by inserting one bit for every three bits in both scanning directions. That is, an expansion bit 2 (represented by the mark X) is inserted at every interval of three information bits in the main scanning direction and one line of expansion bits are inserted at intervals of three information bit lines in the subscanning direction. The method of determining the signal status of the expansion bits is well known in the art, and therefore the explanation thereof is omitted.

FIGS. 2A and 2B show a process for reducing the picture image to 75% of its original size. The facsimile unit at the transmitting side determines original picture information bits 4 to be omitted (represented by the mark Δ) among the original information bits 3 and 4 (represented by the mark O or Δ) as shown in FIG. 2A, such that one bit of every four information bits in the main scanning direction and one of every four lines of information bits in the subscanning direction is eliminated when transmission is subsequently effected (as shown in FIG. 2B).

If picture image processing is achieved in the foregoing manner at the transmission side of the facsimile apparatus, it is not necessary to consider the relation between the transmitting and receiving sides of the facsimile system. In other words, the foregoing expansioncompression method does not depend upon any operation being carried out at the receiving end. Accordingly, this method is advantageous in that it results in increasing the capability of communications with other kinds of communication systems. However, if picture image processing is undertaken only at the signal transmitting side, in the case of picture image enlargement as shown in FIGS. 1A and 1B, the time necessary for signal transmission increases by 25% (since there is 25% more data to be transmitted).

SUMMARY OF THE INVENTION

The present invention is intended to solve the above-mentioned problem, and thus, an object of the present invention is to provide a facsimile apparatus capable of effectively transmitting a picture image which is to be enlarged or reduced in size, without increasing the transmission time thereof.

This and other objects of the invention are attained by carrying out the entire enlargement process (or a portion thereof) at the receiving side. The receiving side initiates enlargement processing in response to an instruction signal (or a partially enlarged picture signal) from the transmitting side, thereby eliminating the increase of the amount of data to be transmitted to thereby minimize the transmission time.

BRIEF DESCRIPTION OF THE DRAWINGS

The structure of the present invention will become more apparent upon a detailed description of the preferred embodiment thereof. In the description to follow, reference will be made to the accompanying drawings, in which.

DETAILED DESCRIPTION OF THE PREFERRED EMBODIMENT

Figure 3:
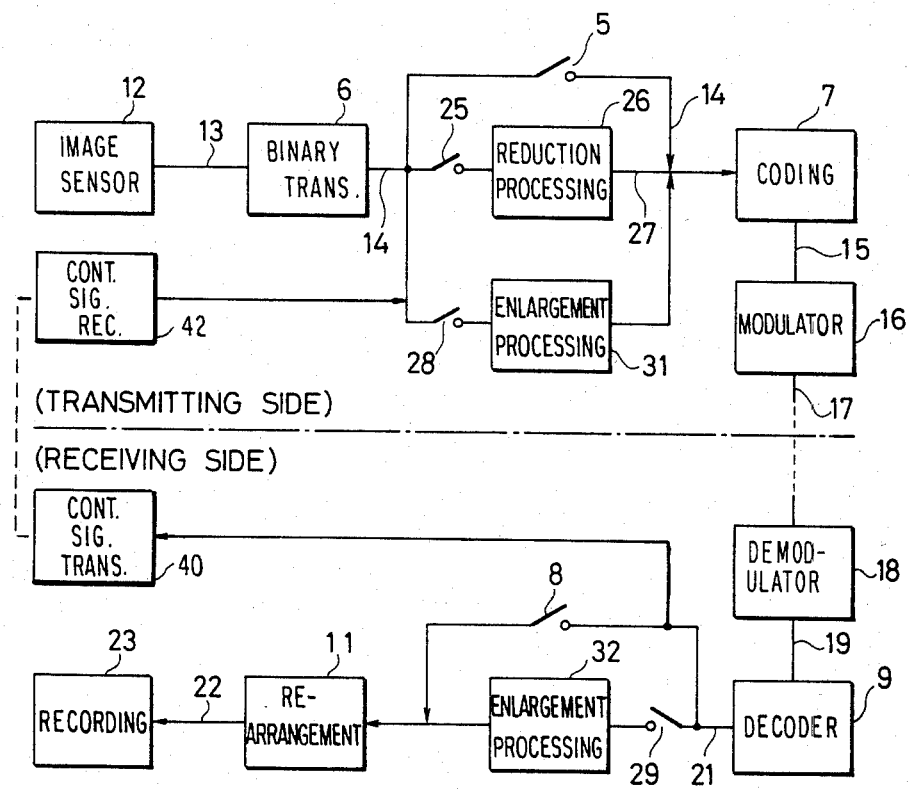
FIG. 3 is a block diagram of the facsimile apparatus according to the preferred embodiment of the present invention.

The preferred embodiment of the present invention will now be described with reference to FIG. 3, which shows a block diagram of a facsimile apparatus in which a picture image is enlarged or reduced by bit-insertion or bit-omission, as previously described. The case where equal size recording is to be carried out will first be described. Assuming that a control signal requesting transmission of an equal size picture image is transmitted from a control signal source 40 at the receiving side facsimile unit (which is shown in the lower half of FIG. 3, to a control signal receiver 42 at the transmitting side facsimile unit (which is shown in the upper half of FIG. 3), the contact of a first switch 5 is closed in response thereto so as to connect the output side of a binary transformation circuit 6 to the input side of a coding circuit 7. At this time, in the receiving side facsimile unit, the contact of a second switch 8 is closed to connect the output side of a decoding circuit 9 to the input side of a rearrangement circuit 11.

If picture image transmission is initiated with the facsimile system in this state, an analog picture signal 13 produced from an image sensor 12 at the transmitting side is converted by the binary transformation circuit 6 into a two-valued digital picture signal 14 which is applied to the coding circuit 7. In the coding circuit 7, the digital picture signal 14 is coded to suppress the bit redundancy thereof and the resulting compressed picture signal 15 is modulated by a modulator 16. The modulated picture signal is transmitted through a line 17 to a demodulator 18 in the facsimile unit at the receiving side. A demodulated picture signal 19 is converted by a decoding circuit 9 into a digital picture signal 21 which is applied to a rearrangement circuit 11. In the rearrangement circuit 11, the digital picture signal 21 is rearranged in accordance with a recording head driving system. A rearranged picture signal 22 is then applied to a recording section 23 and the recording of the picture signal is achieved by a suitable recording system such as a thermo-sensitive recording system, etc. As described above, when the picture image is neither enlarged nor reduced, the digital picture information signal 14 produced by the binary transformation circuit 6 corresponds bit-to-bit with the picture signal 22 supplied to the recording section 23.

A description will now be made for the case in which recording is made with a multiplying factor of 75% at the receiving side. In this case, a control signal requesting the 75% reduction is transmitted from the receiving side to the transmitting side prior to the transmission of the picture signal. In the transmitting side facsimile unit, the contact of the first switch 5 is opened in response to this control signal, while the contact of a third switch 25 is closed. In the receiving side facsimile unit the contact of the second switch 8 is closed.

Figure 1A:
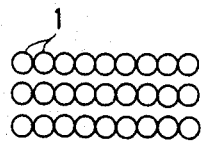
FIGS. 1A and 1B are diagrams showing a method of enlarging a picture image by providing expansion bits thereto.
Figure 1B:
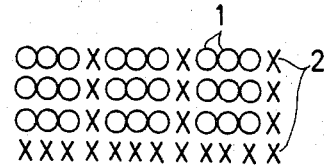
Figure 2A:
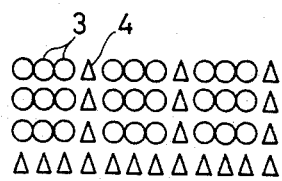
FIGS. 2A and 2B are diagrams showing a method of reducing a picture image by omitting original picture image information bits.
Figure 2B:
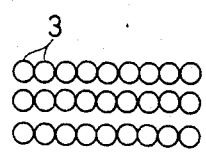

If picture image transmission is initiated with the facsimile system in this state, the digital picture signal 14 produced by the binary transformation circuit 6 is supplied to a reduction processing circuit 26 in the transmitting unit. The reduction processing circuit 26 performs the bit-omission processing as shown in FIGS. 2A and 2B, and produces a reduced picture signal 27. The reduced picture signal 27 is supplied to the coding circuit 7, the output of which is transmitted to the receiving side as described above. Thus, the recording section 23 forms a recorded picture reduced to 75% of its original size. In this case, since the amount of data transmitted through line 17 is reduced by 25% in comparison with the amount of data transmitted in the case of equal size picture signal transmission, the transmission time is reduced.

Finally, a description will be made with respect to the case where recording is made with a multiplying factor of 125% at the receiving side. In this case, a control signal requesting the 125% enlargement is transmitted from the receiving side to the transmitting side prior to the transmission of the picture signal. In the transmitting side facsimile unit, the contact of the third switch 25 is opened in response to this control signal, while the contact of a fourth switch 28 is closed. In the receiving side facsimile unit, the contact of the second switch 8 is opened and the contact of a fifth switch 29 is closed.

If picture image transmission is initiated with the facsimile system in this state, the digital picture signal 14 produced from the binary transformation circuit 6 is supplied to an enlargement processing circuit 31. The enlargement processing circuit 31 performs the following processing with respect to the time necessary for the recording section 23 in the receiving side to record one line of an enlarged picture image:

(1) When the recording speed is sufficiently high, the digital picture signal 14 is sent to the coding circuit 7 as is; or (2) Enlargement processing is carried out in the subscanning direction, or an instruction signal is inserted.

In the above-mentioned first case, the receiving side facsimile unit is ready to receive a picture signal transmitted from the transmitting facsimile unit. Accordingly, it is possible to insert expansion bit lines at the rate of one line for every three information bit lines in the subscanning direction at the enlargement processing circuit 32 in the receiving unit. Similarly, an enlargement process in which expansion bits are inserted in the main scanning direction at the rate of one expansion bit for every three information bits is performed by the enlargement processing circuit 32 (which supplied with the digital picture signal 21 from the fifth switch 29). Thus, the recording section 23 forms a recorded picture enlarged to 125% of its original size. In this case, the amount of data transmitted through line 17 is equal to that of the case of equal size recording, and therefore the transmission time is reduced in comparison with the conventional expansion method.

Next, in the above-mentioned second case, enlargement processing in the subscanning direction is performed in the transmission side facsimile unit. This is done in order to avoid a situation in which picture signal transmission is maintained while picture signal recording is made with respect to the expansion bit lines, since such a situation would result in disrupting the line synchronization. Accordingly, the enlargement processing circuit 31 of the transmission side facsimile unit forms expansion bit lines (at the rate of one expansion bit line for every three information bit lines) and sends out expansion bit lines as picture signals for these lines. Alternatively, the transmitting unit may merely produce either a signal instructing the enlargement in the subscanning direction, or a series of dummy bits. When the inserted line of the picture signal is transmitted, the enlargement processing circuit 32 of the receiving side facsimile unit performs the enlargement process by inserting an expansion bit for every three information bits on every line (i.e. only in the main scanning direction). When either an enlargement instructing signal or a series of dummy bits are transmitted, the enlargement processing circuit 32 of the receiving side facsimile unit performs the enlargement process both in the main scanning and the subscanning direction.

In either case, the recording section 23 produces a recorded picture enlarged to 125% of its original size. When the transmission side facsimile unit transmits a picture signal which has been subjected to a one-line-for-every-three-lines enlargement process, the amount of data transmitted through the line 17 is less than that transmitted in the case where processing it totally completed at the transmitting unit. Thus, the transmission time is reduced accordingly. In the case where either an enlargement instruction or a series of dummy bits are transmitted, picture signal transmission can be carried out without disrupting line synchronization as a function of the recording speed at the recording side. Accordingly, in the case where it takes a longer time to transmit one expansion line of the picture signal than it takes to record the expansion line, the transmission time can be reduced by an amount of time corresponding to the difference between the respective transmission and recording times.

As described above, according to the present invention, effective data transmission can be performed while reducing the expenses for recording picture image such as the rent of transmission lines by minimizing the transmission time.

Further, in the case where a picture signal is enlarged in the subscanning direction at the transmission side, it is possible to enlarge the picture by increasing the density of the subscanning lines in reading the picture information.

What is claimed is:

1. A facsimile apparatus in which a image of an original document is transmitted and recorded, comprising:
a transmitting unit, said unit performing a sequential scanning operation in a main scanning direction on said document to produce an analog picture signal indicative of the document image;
means to convert said analog picture signal into a digital picture signal;
a receiving unit, said unit receiving said digital picture signal and recording said image of said document,
said receiving unit producing a first control signal when said recorded image is to be expanded with respect to said document image and a second control signal when said recorded image is to be reduced with respect to said document image;

wherein said receiving unit is set to digitally expand at least a portion of said picture signal upon generation of said first control signal, and said transmitting unit is set to digitally reduce said picture signal upon reception of said second control signal.

2. The facsimile apparatus as recited in claim 1, wherein said receiving unit expands said image of said received picture signal in both said main scanning direction and a subscanning direction perpendicular to said main scanning direction upon reception of said second control signal.

3. The facsimile apparatus as recited in claim 1, wherein said transmitting unit reduces said document image of said picture signal to be transmitted in both said main scanning direction and a subscanning direction perpendicular to said main scanning direction upon reception of said picture signal from said transmitting unit.

4. The facsimile apparatus as recited in claim 1, wherein said transmitting unit expands said document image of said picture signal to be transmitted in a subscanning direction perpendicular to said main scanning direction upon reception of said first control signal from said receiving unit.

5. The facsimile apparatus as recited in claim 4, wherein said receiving unit expands said document image of said received picture signal in said main scanning direction.

6. The facsimile apparatus as recited in claim 1, wherein said transmitting unit produces an expansion signal upon reception of said first control signal from said receiving unit.

7. The facsimile apparatus as recited in claim 6, wherein said receiving unit expands said document image of said received picture signal in both said main scanning direction and a subscanning direction perpendicular to said main scanning direction upon reception of said expansion signal from said transmitting unit.

8. The facsimile apparatus as recited in claim 7, wherein said expansion signal comprises a series of dummy bits.

9. The facsimile apparatus as recited in claim 1, wherein said document image comprises a plurality of information bits, and wherein said document image of said picture signal is expanded by periodically inserting expansion bits between said information bits in both the main scanning direction and a subscanning direction perpendicular to said main scanning direction.

10. The facsimile apparatus as recited in claim 9, wherein said document image of said picture signal is reduced by periodically deleting said information bits thereof in both the main scanning direction and a subscanning direction perpendicular to said main scanning direction.

11. The facsimile apparatus as recited in claim 10, wherein said transmitting unit comprises:
  means for sequentially scanning said original document in a main scanning direction and producing said analog picture signal;
  said means for converting said analog picture signal into a digital signal having a plurality of information bits;
  conductor means in said transmitting unit;
  a means for periodically removing information bits from said binary signal;
  a means for periodically inserting expansion information bits into said binary signal;
  switching means for connecting one of said conductor means, said removal means and said insertion means to an output of said conversion means;
  a coding means for coding an output of said conductor means in said transmitting unit, said removal means and said insertion means and producing a coded signal; and
  means for modulating said coded signal to produce a modulated picture signal.

12. The facsimile apparatus as recited in claim 11, wherein said insertion means produces an insertion signal.

13. The facsimile apparatus as recited in claim 11, wherein said receiving unit comprises:
  means for receiving said modulated picture signal and demodulating said signal to produce a demodulated picture signal;
  means for decoding said demodulated picture signal to output a decoded picture signal;
  conductor means in said receiving unit;
  a second means for periodically inserting dummy information bits into said decoded picture signal;
  a second switching means for connecting one of said conductor means in said receiving unit and said second insertion means to said output of said decoding means;
  means for rearranging signals from said second conductor means and said second insertion means; and
  means for recording said document image on a recording material.

* * * * *